United States Patent

[11] 3,570,562

[72] Inventor Charles W. Tracy
Tallahassee, Fla.
[21] Appl. No. 836,363
[22] Filed June 25, 1969
[45] Patented Mar. 16, 1971
[73] Assignee International Enterprises, Inc.
Tallahassee, Fla.

[54] ATTACHMENT FOR A PORTABLE SAW
6 Claims, 6 Drawing Figs.

[52] U.S. Cl................................................... 143/6,
143/47
[51] Int. Cl..................................................... B27b 27/06

[50] Field of Search.......................................... 143/6—43,
6—47, 47—6, 47

[56] References Cited
UNITED STATES PATENTS
1,700,189  1/1929  Wikstrom.................... 143/6
3,304,967  2/1967  Kujan.......................... 143/6

Primary Examiner—Donald R. Schran
Attorneys—A. Yates Dowell and A. Yates Dowell, Jr.

ABSTRACT: Apparatus mountable on the bed plate of a portable saw and utilized to guide the saw along a predetermined line of cut.

Patented March 16, 1971 3,570,562
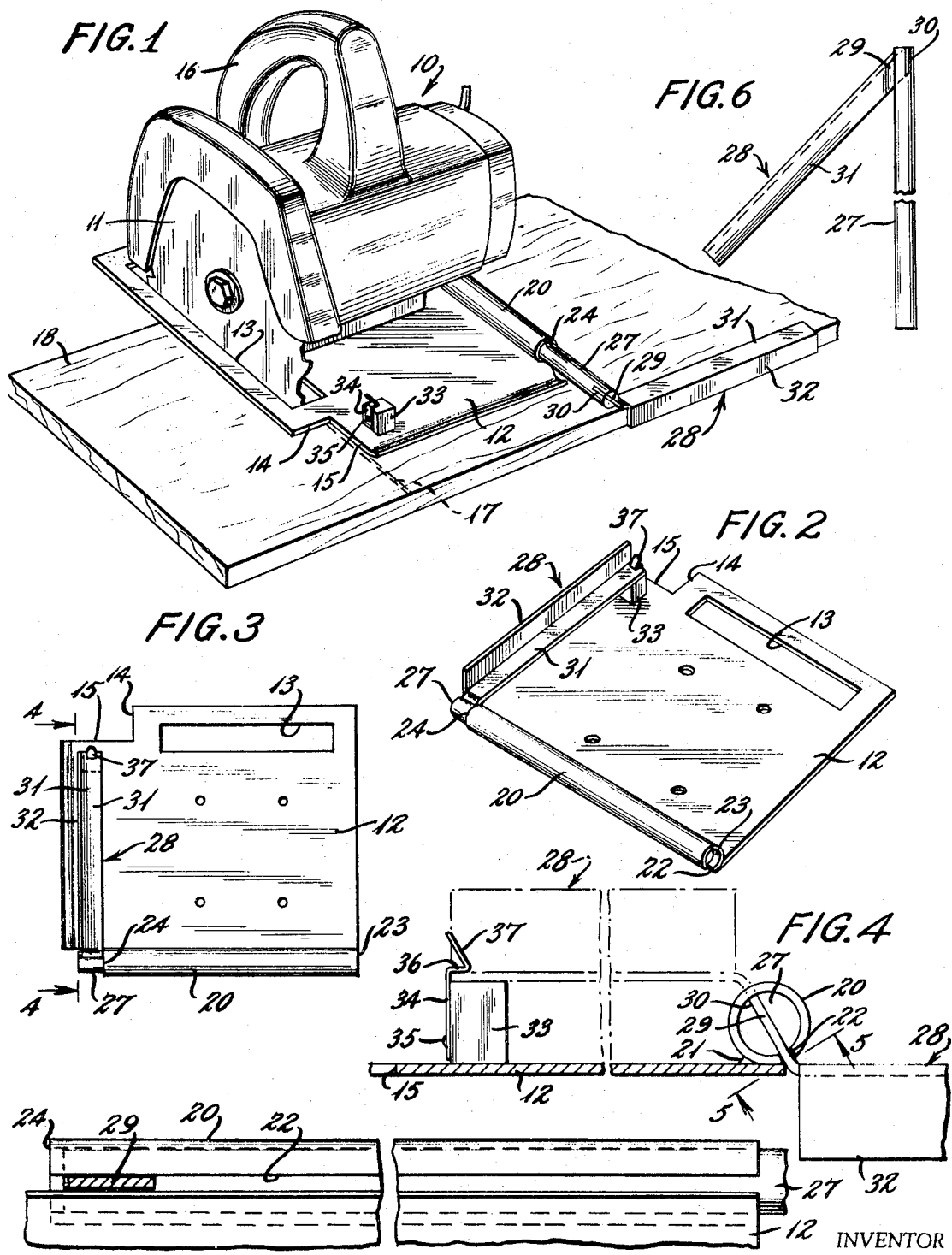
INVENTOR
CHARLES W. TRACY
BY A. Yates Dowell &
A. Yates Dowell, Jr.
ATTORNEYS

ATTACHMENT FOR A PORTABLE SAW

BACKGROUND OF THE INVENTION

1. Field of the Invention

This invention relates generally to woodworking of various kinds and relates particularly to apparatus mountable on a portable saw and adapted to guide the cutting blade of the saw along a predetermined line.

2. Description of the Prior Art

The cutting of wood or other material along a straight line has been a problem since man first began to construct tools, furniture and shelters. Accordingly, many devices have been provided for performing the cutting function and for guiding the material being cut. The cutting of material by fixed circular or radial saws has been solved by providing a bed plate with guides for moving the material to the saw blade along a fixed guide in the case of the circular saw, or moving the saw blade to the material along a fixed guide in the case of the radial saw. In many instances it has been found desirable to provide a portable power saw in which the saw could be carried to the job site and perform the cutting action after the material had been erected or marked in accordance with actual existing conditions. Some efforts have been made to provide portable saws with guide means, including some angularly adjustable guide means; however, these devices have not been entirely satisfactory since in most cases it was necessary that the device be attached to the saw when it was to be used and disconnected when not in use so that the saw could retain its full potential as a portable instrument. Also, the angularly adjustable guide means have not been satisfactory due to slight human as well as mechanical errors in the fixing of the angles since only a small protractor can be accommodated. Other devices have been provided which have been fixed to portable saws; however, these devices have limited the usefulness of the saw and therefore it was not capable of performing the full range of operations for which the saw was designed.

SUMMARY OF THE INVENTION

The present invention is an attachment that can be connected to the bed plate of a portable saw or formed integrally therewith and adapted to engage the material being cut to guide the saw blade along a predetermined line when in use. Also the device is movable to an easily accessible position when not in use, and normally is confined within the limitations of the bed plate so that the saw can perform all of the functions for which it was intended.

It is an object of the invention to provide a telescoping guide for a portable saw which is adapted to engage material being cut and guide the saw along a predetermined line as well as to be locked in a readily accessible inoperative position when not in use.

Another object of the invention is to provide an attachment for a portable saw having a fixed portion mounted on the bed plate of the saw and an easily replaceable cooperating portion adapted to engage the material being cut and guide the fixed portion along a predetermined line and at a predetermined angle.

BRIEF DESCRIPTION OF THE DRAWING

FIG. 1 is a perspective illustrating one application of the invention.

FIG. 2 is a perspective of the bed plate of a portable saw with the device of the present invention connected thereto in inoperative position.

FIG. 3 is a top plan view thereof.

FIG. 4 is an enlarged fragmentary section on the line 4—4 of FIG. 3.

FIG. 5 is a section on the line 5—5 of FIG. 4, and

FIG. 6 is a fragmentary top plan view of a modified form of guide.

DESCRIPTION OF THE PREFERRED EMBODIMENT

With continued reference to the drawing, a portable saw 10 is provided with a cutting blade 11 and such saw is mounted on a bed plate 12 which normally has a slot 13 in which the blade 11 is located. Preferably the bed plate 12 has a notch 14 in one corner and one edge 15 of such notch is in alignment with the saw blade 11 and functions as a guide so that the operator can grasp a handle 16 and guide the saw along a line or mark 17 previously inscribed on a board 18 or other object to be cut. The bed plate 12 is substantially flat and is located at a right angle to the plane of the blade 11 to support the saw and cause the saw blade to make a perpendicular cut in the board 18. The structure thus far described is conventional in the prior art and forms no part of the present invention.

Along the side of the bed plate 12 opposite the slot 13 an elongated hollow cylindrical barrel 20 is provided and such barrel is permanently connected to the bed plate in any desired manner, as by welding 21, or if desired such barrel could be formed as an integral part of the bed plate. The axis of the barrel 20 is generally parallel with the slot 13 and the cutting blade 11. The barrel 20 has a relatively narrow slot 22 extending the full length thereof and, as indicated in FIG. 4, such slot is located adjacent to the edge of the bed plate 12. The rear end 23 of the barrel 20 preferably is located substantially in alignment with the rear edge of the bed plate 12 and the front of such barrel is spaced rearwardly a short distance from the leading edge of such bed plate for a purpose which will be described later.

An elongated generally cylindrical bolt or pin 27 is slidably and rotatably mounted within the barrel 20 in a position to be telescopically extended and retracted relative to such barrel. An angular board-engaging support member 28 is fixed to one end of the bolt 27 in any desired manner, as by a tongue 29 mounted within a slot 30 in the bolt and welded or otherwise attached thereto to form a permanent connection. The support member 28 is generally angular in cross section and includes a substantially horizontal flange 31 and a substantially vertical flange 32 located at right angles to the horizontal flange 31 and integrally connected thereto. As indicated in FIGS. 1, 2 and 3, the support member 28 is generally normal to the bolt 27 and, as indicated in FIG. 6, the support member is attached to the bolt at any desired angle. Preferably the bolt 27 is of substantially the same length or slightly longer than the barrel 20 to accommodate relatively wide boards and still remain within the confines of the bed plate 12 when not in use. In some instances, particularly when the support member is attached at an angle to the bolt and the resulting length of cut is substantially longer, the bolt 27 may be much longer than the barrel 20.

In order to hold the support member 28 in fixed position when not in use, a block 33 is mounted on the bed plate 12 in spaced relation to the barrel 20 and such block is provided with a latching spring 34 connected thereto by a fastener 35. The spring 34 preferably has a flat portion 36 generally parallel to the top of the block 33 and an upwardly extending angular portion 37 which functions as a camming surface.

It is contemplated that a plurality of bolts of varying lengths and having support members disposed at various angles to the axis of the bolt could be provided to accommodate many standard angles of cut. The bolts are easily interchangeable merely by sliding the bolt lengthwise until it is entirely removed from the barrel. Thereafter another bolt may be slid into the barrel to replace the first bolt.

In the operation of the device a mark is placed on the board 18 at the position where the cut is to be made and thereafter the bolt 27 and support member 28 are extended across the board and the support member is placed over the front edge of the board or other material to be cut. In this position the bolt may be extended most of the way out of the barrel 20 and the support member 28 may have its vertical flange 32 in engagement with the edge of the board and the horizontal flange 31 in engagement with the top surface of the board. Thereafter the bed plate 12 of the saw is moved lengthwise of the board until the saw blade 11 is in alignment with the mark previously made on the board. The operator then grasps the support member 28 and the front edge of the board 18 with one hand and moves the saw 10 with the other hand toward the board so that the blade 11 engages the same.

Continued forward movement of the saw will cut the board while the bolt 27 is being retracted into the barrel 20. When the tongue 29 reaches the barrel 20, such tongue will enter the slot 22 so that forward movement of the saw can continue. It is noted that during the operation of the device the bolt 27 and support member 28 become the fixed members, and the barrel 20 and saw 10 become the movable members relative to the board 18.

After the cut has been completed and it is desired to use the saw for some other function, such as ripping or the like, the bolt 27 is moved until the support member 28 is located outwardly of and adjacent to the front end 24 of the barrel. Thereafter the bolt is rotated substantially 180° so that the support member is moved from a position extending laterally outwardly of the bed plate to a position overlying the bed plate. In this position the outer end of the support member will engage the angular camming portion 37 of the spring 34 and force the upper end of the spring outwardly until the support member passes the flat portion 36 of the spring 34 and permits the spring to snap back so that the flat portion 36 is disposed over the horizontal portion 31 of the support member and locks the support member in inoperative position. When it is again desired to use the attachment, it is necessary only to apply lateral pressure to the angular portion 37 of the spring to release the support member after which the support member can be swung to operative position.

I claim:

1. An attachment for a portable saw having a saw blade and a generally flat bed plate, said attachment comprising an elongated generally cylindrical barrel mounted on said bed plate and generally parallel with said saw blade, said barrel having an elongated slot disposed lengthwise of the same, at least one end of said slot being open, an elongated bolt slidably and rotatably received within said barrel, a support member fixed to one end of said bolt and having portions engageable with an object to be cut, and said support member being extendable across the article to be cut while at least a portion of the bolt remains within said barrel, whereby said barrel and said bolt guide the saw blade along a predetermined line of cut when the saw blade is moved by the operator.

2. The structure of claim 1, including latch means for locking said support member and said bolt in inoperative position.

3. The structure of claim 1, in which said support member is fixed to said bolt at a right angle.

4. The structure of claim 1, in which said support member is fixed to said bolt at any desired angle.

5. The combination of a portable saw and guide means therefor, said saw comprising a cutting blade and a bed plate, said attachment comprising an elongated generally cylindrical barrel fixed to said bed plate generally parallel to said saw blade, said barrel having an elongated slot extending substantially the full length thereof, at least one end of said slot being open, an elongated bolt slidably and rotatably received within said barrel, a support member having generally horizontal and vertical flanges fixed to one end of said bolt and adapted to engage two sides of an article to be cut, and latch means carried by said bed plate for receiving and supporting said support member in inoperative position.

6. The structure of claim 5, in which said bolt is of a length at least equal to the length of said barrel.